Dec. 7, 1926.

A. E. GILMAN 1,609,709

CORN SHELLER

Filed Dec. 2, 1925

A. E. GILMAN 1,609,709

CORN SHELLER

Filed Dec. 2, 1925    3 Sheets-Sheet 2

Inventor:
Albert E. Gilman
John Howard McClary
his Atty.

Dec. 7, 1926.

A. E. GILMAN 1,609,709

CORN SHELLER

Filed Dec. 2, 1925  3 Sheets-Sheet 3

Inventor:
Albert E. Gilman
by John Howard McElroy
his Atty.

Patented Dec. 7, 1926.

1,609,709

UNITED STATES PATENT OFFICE.

ALBERT E. GILMAN, OF OTTAWA, ILLINOIS, ASSIGNOR TO KING & HAMILTON COMPANY, OF OTTAWA, ILLINOIS, A CORPORATION OF ILLINOIS.

CORN SHELLER.

Application filed December 2, 1925. Serial No. 72,716.

My invention is concerned with power corn shellers, and consists of a novel sheller embodying a new combination and arrangement of elements that is simpler, more cheaply constructed, and which has a greater capacity for its size and weight than that of corn shellers heretofore marketed.

To illustrate my invention, I annex hereto three sheets of drawings in which the same reference characters are used to designate identical parts in all the figures, of which,—

Figure 2:
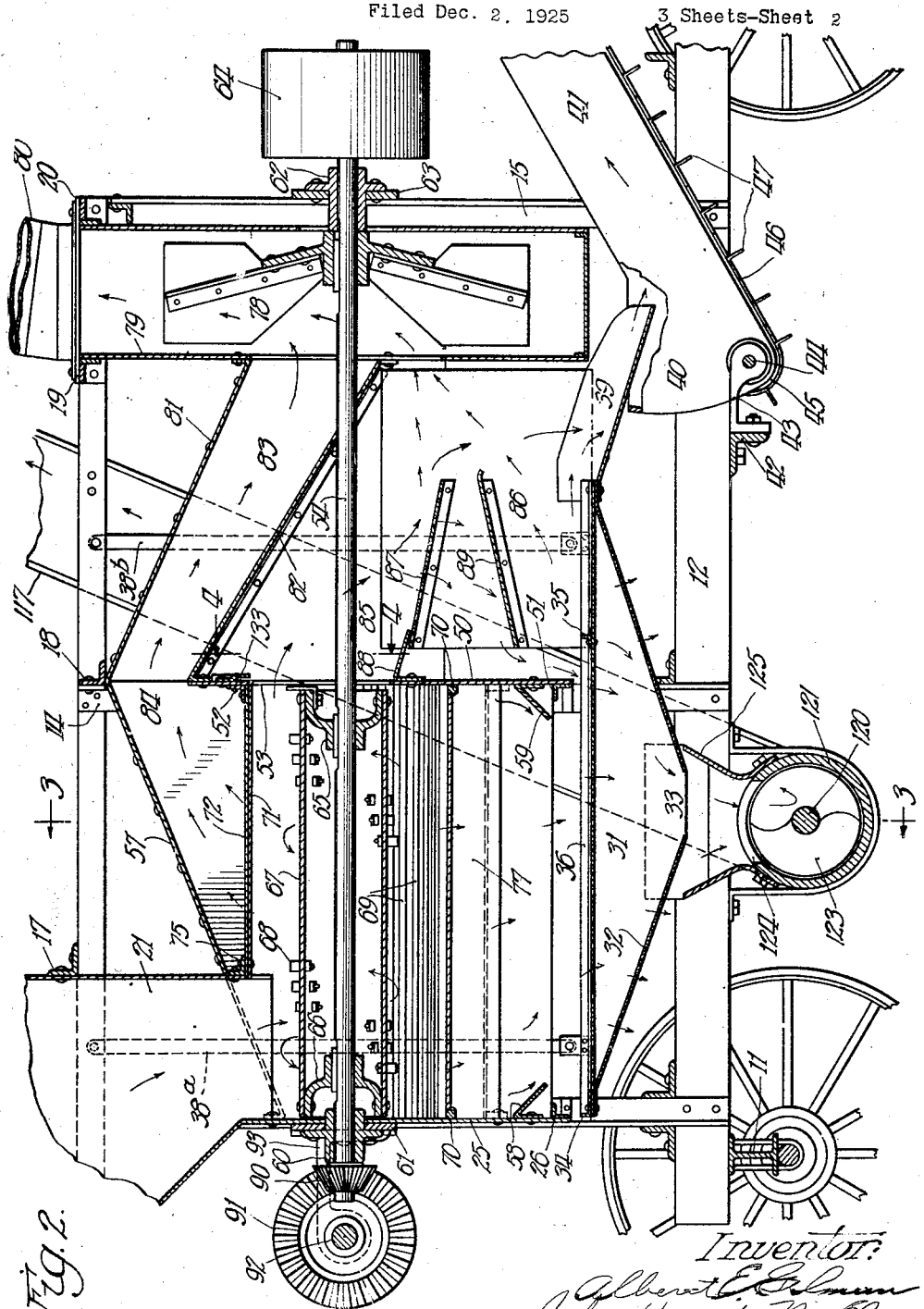
Fig. 2 is a central longitudinal section though the main portion of the machine, but on a larger scale.
Figure 3:
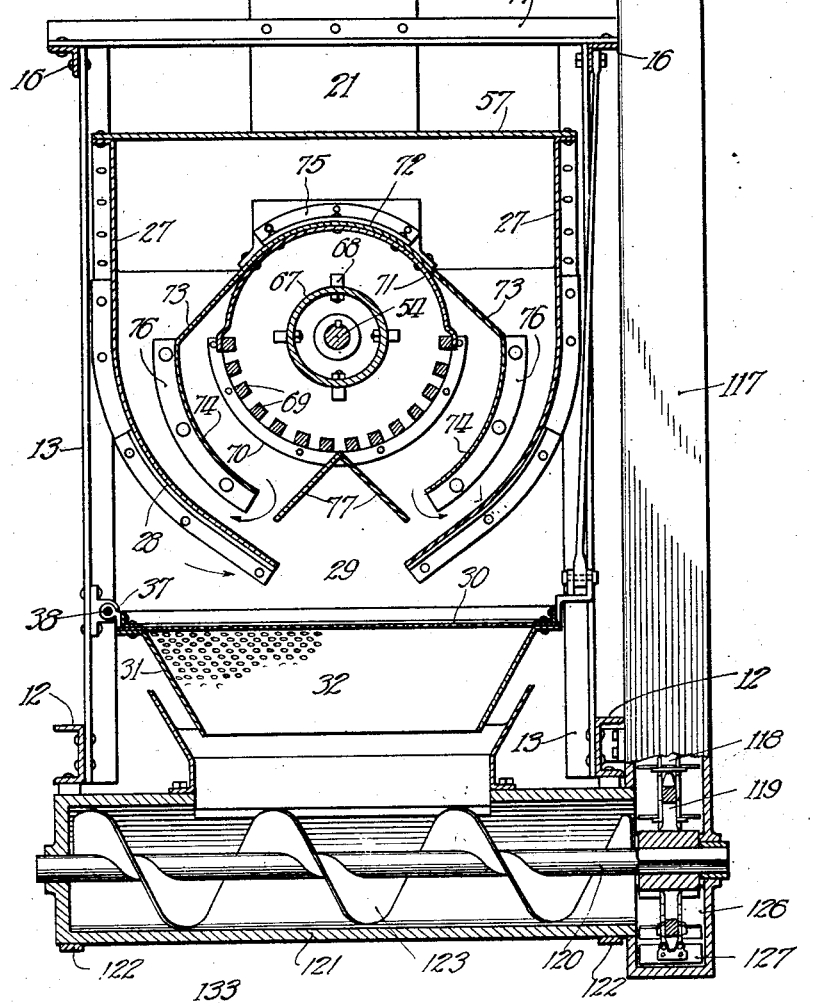
Fig. 3 is a cross-section on the line 3—3 of Fig. 2.
Figure 4:
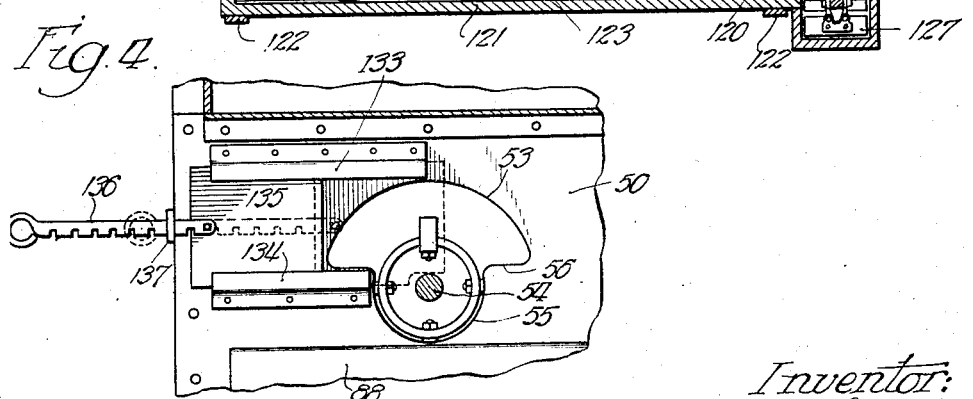
Fig. 4 is a detail as seen from the line 4—4 of Fig. 2.

For the portable construction ordinarily employed, I provide a truck with the customary wheels 10 and axles 11 upon which are supported in the customary manner the main side bars 12 forming the base of the frame. Suitably supported from these side bars 12 on each side are the standards or vertical side pieces 13, 14 and 15, which are connected at the tops of the pieces 14 and 15 and toward the upper end of the piece 13 by the horizontal top frame members 16. These horizontal top frame members 16 are connected by the four transverse bars or angle irons 17, 18, 19 and 20, as best seen in Fig. 2. Supported between the upper ends of the standards 13 is the discharge spout portion 21 of the feeder 22, which is of any desired construction and is shown as supported on either side from the standards 13 by the horizontal pieces 23 and the brace pieces 24 connecting the pieces 13 and 23. The feed end of the machine is closed by the sheet metal plate 25 suitably supported from the standards 13 and the cross-piece 26 connecting said standards, and what I may call the air chamber has its front end formed by the plate 25 and its sides formed by the plates 27 having their upper portions vertical while their lower portions 28, as seen in Fig. 3, are curved and converge so as to leave a comparatively narrow passage or slot 29 through which the grain falls on the top sieve 30 of the customary riddle which has the imperforate side pieces 31 and the perforate converging bottom pieces 32, leaving between their lower ends the space 33 through which the corn falls into the conveyor. The riddle has the rectangular framework consisting of the angle iron crosspieces 34 and 35 and the angle iron side pieces 36, which have ears 37 secured thereto on the front side by which the riddle is slidingly mounted on that side upon the rod 38 connecting the standards 13 and 14 so that the riddle can be reciprocated by the mechanism hereinafter described. On the other side it is suspended by the pivoted links 38ª and 38ᵇ, as is customary in such devices. The rear end of the riddle is provided with the downwardly inclined discharge spout 39 which opens into the boot 40 of a cob conveyor 41, which may be of any desired construction, and is supported at its lower end from the cross-piece 42 which has secured thereto the ears 43 in which is mounted the shaft 44 carrying the customary sprocket wheels 45 for the conveyor chains 46, which carry the customary flights 47 and run over the sprocket wheels 48 journaled in the upper end of the conveyor trough, which may be supported by the bail 49, and the chain 49ª connected thereto and caught over the hook 49ᵇ supported from the framework to hold the trough 41 at any desired angle.

The forward end of the air chamber is formed by the plate 50 supported from the cross-pieces 51, 52, and is provided with the outlet aperture 53 made up of two portions, both concentric with the power shaft 54, the lower portion 55 constituting a portion of a circle extending through something over 180°, while the upper portion, constituting a portion of a circle having a greater radius, extends through something less than 180°, the two portions being connected by the horizontal portions 56. The top of the air chamber is formed by the inclined plate 57 riveted at its edges to the side pieces 27 and secured at its forward end to the standards 13, and at its rear end to the standards 14 and the cross-piece 18. Secured to the bottom portion of the front end plate 25 between the converging lower ends 28 of the side pieces is the flange 58 inclined inwardly to direct the grain toward the center of the riddle, and secured on the other end plate 50 in a corresponding position is the companion deflecting flange 59. The power shaft 54 is journaled at its forward end in a suitable bearing casting 60 supported by the cross-plate 61 from the standards 13, while its other end is journaled in a similar bearing casting 62 supported from the cross-plate 63 secured to the standards 15. It has on its rear end the belt pulley 64 by which power is applied to the machine, and it has secured thereon toward its front end the circular end castings 65 and 66 of the cylinder 67, which is of a customary cylindrical construction with the helically arranged teeth 68 projecting therefrom. The shelling concave has its lower half formed by the customary rectangular iron bars 69 spaced apart in the customary manner and supported from the semi-circular end pieces 70 secured to the plates 25 and 50. The ears of corn are acted on between the teeth 68 and the bars 69 to shell the grains from the cobs in the customary manner. The top of the shelling concave is formed by the semi-circular piece of sheet metal 71, which is secured at its lower edges to the uppermost pair of bars 69, while it is supported at its top from the inner casing made up of sheet metal and consisting of the curved top portion 72 concentric with the shaft 54 which is connected by the inclined straight portion 73 with the two lower curved portions 74, likewise concentric with the shaft 54, but having a greater radius than the portion 72. The top portion 72 is secured at its ends to the curved angle iron 75 connected to the discharge spout portion 21 of the feeder, and to the cross-piece 52. The lower portions 74 have the flanges 76 formed thereon by which they are riveted to the end plates 25 and 50. These end plates are also connected by an angular deflecting piece 77 which has its angle in the same vertical plane as the shaft 54, and has its edges between the adjacent edges of the parts 28 and 74.

Secured near the rear end of the power shaft 54 is a suction fan 78, which is mounted in a suction fan casing 79 suitably secured to the standards 15 and the cross-pieces 19, 20, and terminating in the discharge pipe 80 which preferably has the flexible curved section so that the direction and place of discharge can be controlled by shifting the spout. The eye of the fan casing is divided into two portions, the larger upper portion of which is supplied with air from the passage formed by the inclined top piece 81 and bottom piece 82 connected by the side pieces 83, the channel at its upper end being connected with the opening 84 into the air chamber, and its lower end opening into the eye of the fan casing and furnishing the greater portion of the air thereto. Beneath the side pieces 83 are the quadrilateral side pieces 85 connecting the standards 14 and the fan casing 79, while below and inside of these side pieces 85 are the side pieces 86 secured to the rear end of the riddle frame and extending up some distance above the lower edge of the side pieces 85, as best seen in Fig. 2. These side pieces 86 reciprocate back and forth with the connected riddle 31. They are connected across the top by the perforated downwardly inclined plate 87, the forward end of which reciprocates beneath the downwardly inclined flange 88 which is secured to the plate 50 just below the outlet 53 from the shelling concave, so that the cobs discharged from the outlet 53 will fall on the plate 87 and be directed thereby on to the cob spout 39. If any grains of corn should be discharged with the cobs, they can fall through the perforations in the screen 87 and upon the imperforate plate 89 connected at its edges to the side pieces 86 and inclined downwardly in the opposite direction so that grains falling thereon will be discharged on the top screen of the riddle 31.

Figure 1:
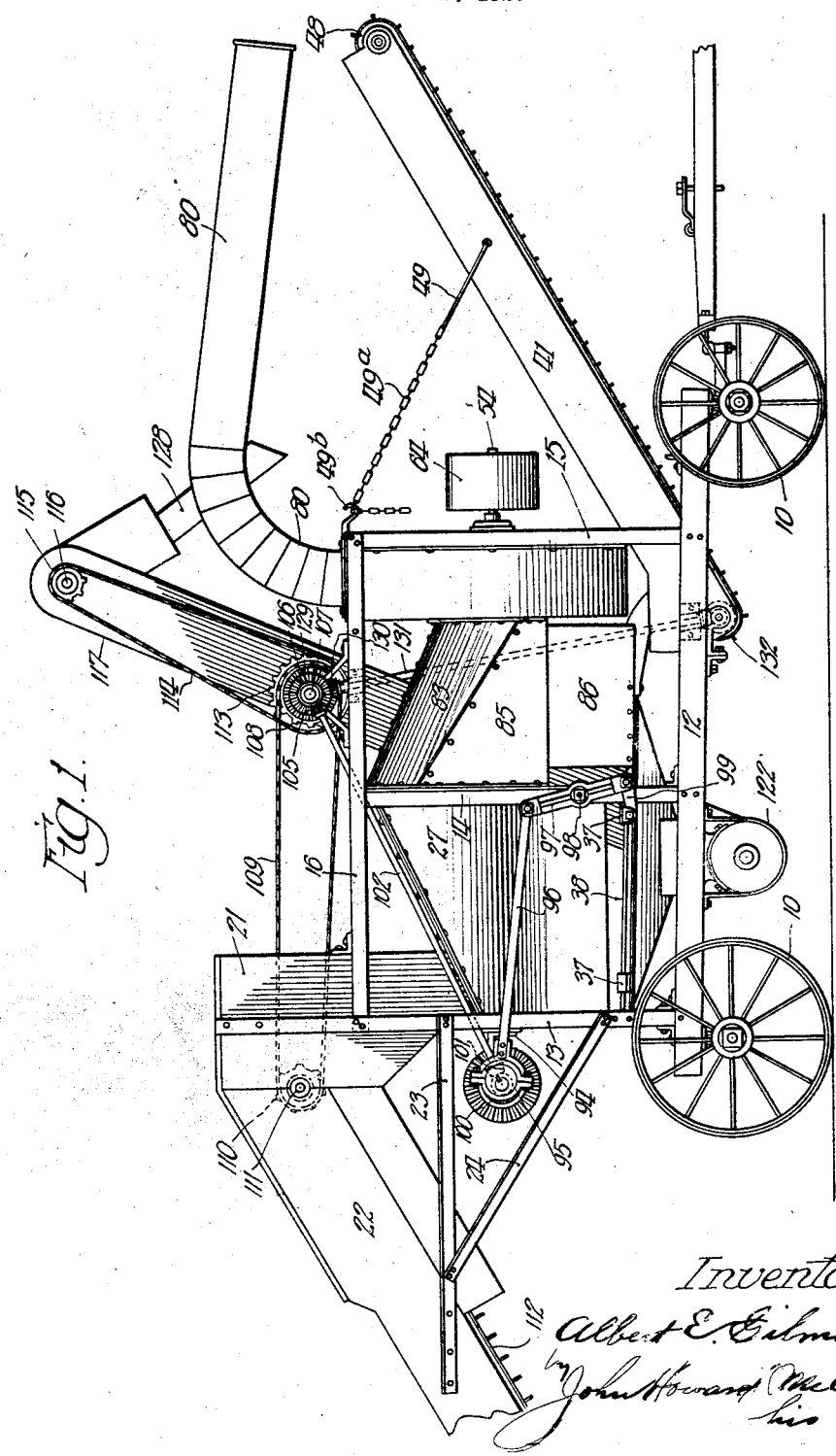
Fig. 1 is a side elevation of a sheller embodying my invention.

The shaft 54 has secured on its forward end the bevel pinion 90 which meshes with the bevel wheel 91 secured on the countershaft 92 journaled in the bearing brackets 93, 94 secured to and projecting forward from the cross-plate 61. The shaft 92 carries an eccentric 95 which is connected by the link 96 with the rocking lever 97 fulcrumed to the standard 14 at 98 and having its lower end connected by a link 99 with the rear ear 37 of the riddle on that side, so that the rotation of the shaft 54 through the action of the eccentric 95 will reciprocate the riddle in the customary manner. The shaft 92 also carries the bevel gear wheel 100 which drives the bevel pinion 101 secured on the shaft 102 journaled in suitable bearings, not shown, secured to the framework, and carrying at its upper end the bevel pinion 105 meshing with a bevel wheel 106 secured on a shaft 107 journaled in suitable bearings secured on the frame pieces 16. This shaft 107 has secured thereon the sprocket wheel 108 which through the sprocket chain 109 drives the sprocket wheel 110 on the shaft 111 journaled in the feeding elevator 22, and driving the chain 112 thereof so as to feed the corn to the sheller. The shaft 107 also has secured thereon the sprocket wheel 113, which is connected by the sprocket chain 114 with the sprocket wheel 115 secured on the shaft 116 journaled in the upper end of the grain conveyor trough 117 which is supported from the framework of the machine on the opposite side from that seen in Fig. 1, and which has the customary sprocket chain 118 cooperating with a sprocket wheel, not shown, on the shaft 116 and with the sprocket wheel 119 secured on the end of the conveyor shaft 120, which is journaled in suitable bearings in the conveyor trough 121 supported beneath the machine by the U-shaped straps 122 from the side pieces 12. The conveyor shaft 120 has the screw 123 secured thereon, and the upper portion of this generally cylindrical casing 121, as best seen in Fig. 2, has the rectangular opening 124 therein, which opening is surrounded by the sheet metal hopper 125 bolted thereto and having its receiving opening of the size and properly located to receive the portion of the riddle containing the discharge outlet 33. The lower end of the grain conveyor spout 117 forms a boot 126 into which the shelled grain is discharged by the screw 123, and the chain 118 carries the flights 127 by which the grain is elevated to the top of the casing 117 so that it can be discharged into the customary grain discharge spouts 128. The shaft 107 also has secured thereon the bevel gear wheel 129 which drives the bevel gear pinion 130 secured on the upper end of the shaft 131 which extends downward to the shaft 44 where it meshes with a bevel gear wheel 132, indicated in dotted lines in Fig. 1, secured on the shaft 44 so that the necessary power to operate the cob conveyor is applied thereto.

To regulate the size of the aperture 53 through which the cobs are discharged, I secure on the plate 50 the guide flange 133 located above the aperture 53, and the guide flange 134 located below the adjacent portion 56 of said aperture, and in these guide flanges I reciprocate the plate 135 which has connected thereto the notched controlling bar 136 which passes through an aperture in the ear 137, in which it will have sufficient play so that the plate can be caught by the cooperation of any desired notch in the bar 136 with the lower edge of the aperture in the ear 137 to hold the plate in any desired adjustment to regulate the size of the discharge outlet.

Having fully described the construction of my improved sheller, the operation thereof will be readily apparent, and is as follows: Power being applied to the pulley 64, all the gearing heretofore described will be in operation, and ear corn placed in the boot of the conveyor 22 will be carried to the shelling cylinder and discharged in the upper forward portion thereof. As the corn is forced by the feed of the helically arranged teeth 68 to the rear, the grains will be shelled off and the cobs discharged through the aperture 53 on to the flange 88 and the screen 87, whence they will fall on the spout 39 into the boot of the cob conveyor from the upper end of which they will be delivered. The shelled grain will fall between the bars 69 and be separated, as it were, into two streams by the angular plate 77, so that the air being pulled through the grains can function more efficiently in carrying off any chaff associated therewith. The grain then falls through the aperture 29 on to the riddle 31 which separates any husks or any other material which should be removed, allowing the clean grain to fall through the aperture 33 into the conveyor casing 121, from which it will be delivered by the grain conveying spout 117 to the particular wagon which is being loaded. During this operation the fan 78 is furnishing a powerful suction and drawing some air into the casing with the unshelled corn, and this air is mostly drawn upward after it passes the angular plate 77 between the portions 74 and the sides 28, and upward through the opening 84 and down through the trunk through which it leads into the fan casing. A portion of the air drawn into the fan casing is, however, sucked up through the apertures in the perforated plates of the riddle, and serves to carry off chaff from the riddle into the lower portion of the eye of the fan casing, and this portion of the air also passes the cobs as they are discharged, and any loose husks with the cobs will be caught by this current of air and carried into the fan casing, whence they will be discharged through the spout 80.

While I have shown and described my invention as embodied in the form which I at present consider best adapted to carry out its purpose, it will be understood that it is capable of modifications, and that I do not desire to be limited to any interpretation of the following claims except as may be necessitated by the state of the prior art.

What I claim as new and desire to secure by Letters Patent of the United States is—

1. In a corn sheller, the combination with a power shaft, of a cylinder secured thereto, a suction fan driven thereby, a shelling concave having shelling ribs and a corn inlet at one end and a cob outlet at the other, the upper portion of the concave being otherwise imperforate, a casing surrounding the concave having its longitudinal walls formed by metallic sheets diverging from the imperforate top and curved about the shelling ribs but spaced therefrom and separated at the bottom to leave a grain discharge outlet, an air chamber surrounding the concave and casing and having a grain discharge outlet at the bottom, an angular deflecting plate having its lower edges terminating between the two grain discharge outlets, and air passages from the top and bottom of the air chamber to the fan inlet.

2. In a corn sheller, the combination with a power shaft, of a cylinder secured thereto, a suction fan driven thereby, a shelling concave associated with the cylinder having a corn inlet at one end and a cob outlet at the other end, a casing surrounding the body of the concave and open at its bottom to allow shelled grain to fall therethrough, an air chamber surrounding said casing spaced away from it and having a longitudinal outlet opening in the bottom thereof, the lower portions of the casing and air-chamber walls adjacent the grain outlets being substantially inclined so that all materials will readily slide off on them, an angular deflecting plate having its apex above the casing outlet and its lower edges between said outlets to deflect grain onto the walls of the air chamber adjacent the outlet, a fan casing, and a passage from the air chamber to the eye of the fan casing.

3. In a corn sheller, the combination with a power shaft, of a cylinder secured thereto, a suction fan driven thereby, a shelling concave associated with the cylinder having a corn inlet at one end and a cob outlet at the other end, a casing surrounding the body of the concave and open at its bottom to allow shelled grain to fall therethrough, an air chamber surrounding said casing spaced away from it and having the generally concave bottom with a longitudinal slot therein, a fan casing, and a passage from the air chamber to the eye of the fan casing.

4. In a corn sheller, the combination with a power shaft, of a cylinder secured thereto, a suction fan driven thereby, a shelling concave having a corn inlet at one end and a cob outlet at the other end, a casing surrounding the body of the concave and open at the bottom to allow shelled grain to fall therethrough, an air chamber surrounding said casing and spaced away from it having its top inclined upwardly toward the discharge end and having a grain discharge outlet in its bottom, a fan casing, and an air trunk leading from the air chamber above the cob outlet downwardly to the eye of the fan casing.

5. In a corn sheller, the combination with a power shaft, of a cylinder secured thereon, a suction fan driven thereby, a shelling concave associated with the cylinder having a corn inlet at one end and a cob outlet at the other, a casing surrounding the body of the shelling concave and open at the bottom to allow shelled corn to fall therethrough, an air chamber surrounding said casing and spaced away from it, and having a grain discharge outlet in the bottom, a deflecting plate between the opening in the bottom of the casing and the shelling air chamber outlet extending over the edges of said outlet, a fan casing, and a passage from the air chamber to the fan casing.

6. In a corn sheller, the combination with a power shaft, of a cylinder secured thereon, a suction fan driven thereby, a shelling concave associated with the cylinder having a corn inlet at one end and a cob outlet at the other, a casing surrounding the body of the shelling concave and open at the bottom to allow shelled corn to fall therethrough, an air chamber surrounding said casing and spaced away from it, and having a grain discharge outlet in the bottom, an angular deflecting plate between the opening in the bottom of the casing and the air chamber outlet having its apex beneath the shelling concave and its edges spaced away from the opening in the bottom of the casing to deflect air drawn through the concave up toward the top of the air chamber, a fan casing, and a passage from the air chamber to the fan casing.

7. In a corn sheller, the combination with a power shaft, of a cylinder secured toward one end thereof, a suction fan secured toward the other end thereof, a shelling concave associated with the cylinder having a corn inlet at one end and a cob outlet at the other end, a casing surrounding the body of the concave and open at its bottom to allow shelled grain to fall therethrough, an air chamber surrounding said casing spaced away from it and having the generally concave bottom with a longitudinal slot therein, a fan casing, and a passage from the air chamber to the eye of the fan casing.

8. In a corn sheller, the combination with a power shaft, of a cylinder secured toward one end thereof, a suction fan secured toward the other end thereof, a shelling concave having a corn inlet at one end and a cob outlet at the other, a casing surrounding the body of the concave and open at the bottom to allow shelled grain to fall therethrough, an air chamber surrounding said casing and spaced away from it having its top inclined upwardly toward the discharge end, and having a grain discharge outlet in its bottom, a fan casing, and an air trunk leading from the air chamber above the cob outlet downwardly to the eye of the fan casing.

9. In a corn sheller, the combination with a power shaft, of a cylinder secured thereon, a suction fan driven thereby, a shelling concave associated with the cylinder, a fan casing for the fan, and a grain riddle below the shelling concave and extending beyond it toward the fan casing and terminating in a cob discharge spout, said riddle having its sides beyond the concave extending up toward the shaft and having a cob deflector plate between said sides extending from the cob inlet to the cob discharge spout.

10. In a corn sheller, the combination with a power shaft, of a cylinder secured thereon, a suction fan driven thereby, a shelling concave associated with the cylinder, a fan casing for the fan, and a grain riddle below the shelling concave and extending beyond it toward the fan casing and terminating in a cob discharge spout, said riddle having its sides beyond the concave extending up toward the shaft and having a perforated cob deflector plate between said sides extending from the cob outlet to the cob discharge spout, and an oppositely inclined grain deflector plate.

11. In a corn sheller, the combination with a power shaft, of a cylinder secured thereon, a suction fan driven thereby, a shelling concave associated with the cylinder, a fan casing for the fan, and a reciprocating grain riddle below the shelling concave and extending beyond it toward the fan casing and terminating in a cob discharge spout, said riddle having its sides beyond the concave extending up toward the shaft and having a perforated cob deflector plate between said sides extending from the cob inlet to the cob discharge spout, and an oppositely inclined grain deflector plate, said shelling concave having a flange extending therefrom below the cob outlet over the cob deflector plate.

12. In a corn sheller, the combination with a power shaft, of a cylinder secured thereon, a suction fan driven thereby, a shelling concave associated with the cylinder having a corn inlet at one end and a cob outlet at the other, a casing surrounding the body of the shelling concave and open at the bottom to allow shelled corn to fall therethrough, an air chamber surrounding said casing and spaced away from it and having a grain discharge outlet in the bottom, a fan casing, a passage from the outlet of the air chamber to the fan casing, and an air trunk from the shelling air chamber above the cob outlet to the upper part of the eye of the fan casing.

13. In a corn sheller, the combination with a power shaft, of a cylinder secured thereon, a suction fan driven thereby, a shelling concave associated with the cylinder, a fan casing for the fan, a grain riddle below the shelling concave and extending beyond it toward the fan casing and terminating in a cob discharge spout, and an air trunk from the shelling air chamber above the cob outlet to the upper part of the eye of the fan casing, the lower part of the said fan casing eye receiving air from the riddle.

In witness whereof, I have hereunto set my hand, this 24th day of November, 1925.

ALBERT E. GILMAN.